US008649314B2

(12) United States Patent
Lin

(10) Patent No.: US 8,649,314 B2
(45) Date of Patent: *Feb. 11, 2014

(54) PEER-TO-PEER MOBILE DATA TRANSFER METHOD AND DEVICE

(75) Inventor: Daniel J. Lin, San Francisco, CA (US)

(73) Assignee: Pendragon Wireless LLC, Kirkland, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/110,819

(22) Filed: May 18, 2011

(65) Prior Publication Data

US 2011/0217999 A1 Sep. 8, 2011

Related U.S. Application Data

(63) Continuation of application No. 12/832,576, filed on Jul. 8, 2010, now Pat. No. 7,969,925, which is a continuation of application No. 11/042,620, filed on Jan. 24, 2005, now Pat. No. 7,773,550, which is a continuation-in-part of application No. 10/817,994, filed on Apr. 5, 2004, now Pat. No. 7,961,663, and a continuation-in-part of application No. 10/935,342, filed on Sep. 7, 2004, now Pat. No. 7,764,637.

(51) Int. Cl.
*H04W 4/00* (2009.01)

(52) U.S. Cl.
USPC .......... 370/313; 370/395.3; 455/466; 709/206

(58) Field of Classification Search
USPC .............................. 370/313, 395.3
See application file for complete search history.

(56) References Cited

U.S. PATENT DOCUMENTS

| 5,758,282 | A | 5/1998 | Yamashina | |
|---|---|---|---|---|
| 6,545,988 | B1 | 4/2003 | Skog | |
| 6,847,632 | B1 | 1/2005 | Lee | |
| 6,885,871 | B2* | 4/2005 | Caloud | 455/466 |
| 6,990,352 | B2* | 1/2006 | Pyhalammi et al. | 455/466 |
| 7,089,027 | B1 | 8/2006 | Welch | |
| 7,130,582 | B2 | 10/2006 | Barilovits | |
| 7,262,791 | B2 | 8/2007 | Kohno | |
| 7,342,895 | B2* | 3/2008 | Serpa et al. | 370/254 |
| 7,447,211 | B1 | 11/2008 | Scholte | |
| 8,181,226 | B2* | 5/2012 | Lohr | 726/3 |
| 2002/0083127 | A1* | 6/2002 | Agrawal | 709/203 |
| 2002/0165000 | A1* | 11/2002 | Fok | 455/466 |
| 2003/0041108 | A1 | 2/2003 | Henrick | |
| 2003/0105812 | A1 | 6/2003 | Flowers et al. | |

(Continued)

FOREIGN PATENT DOCUMENTS

WO WO 2004/095850 A2 11/2004

OTHER PUBLICATIONS

Rosenberg, et. al. "SIP: Session Initiation Protocol" Standards Track, The Internet Society, Jun. 2002, pp. 1-269.

*Primary Examiner* — Liton Miah
(74) *Attorney, Agent, or Firm* — Law Offices of John Stattler, PC

(57) ABSTRACT

A technique is provided for a direct data transfer session, including for multimedia content, between mobile devices without the need for using a separate multimedia server to store multimedia content. Direct data transfer sessions between mobile devices are established by transmitting necessary address information through page-based messaging services that utilize the underlying digital mobile network databases and services to resolve the identification and location of the mobile devices.

20 Claims, 3 Drawing Sheets

(56) References Cited

U.S. PATENT DOCUMENTS

| | | |
|---|---|---|
| 2003/0126213 A1* | 7/2003 | Betzler .................. 709/206 |
| 2003/0135630 A1* | 7/2003 | Murrell et al. ............ 709/229 |
| 2003/0142654 A1 | 7/2003 | Chambers et al. |
| 2003/0220793 A1 | 11/2003 | Kosaka |
| 2004/0157590 A1* | 8/2004 | Lazaridis et al. ........... 455/415 |
| 2004/0208186 A1 | 10/2004 | Eichen |
| 2004/0225525 A1* | 11/2004 | Weitzman .................. 705/1 |
| 2004/0235503 A1 | 11/2004 | Koponen |
| 2004/0249953 A1 | 12/2004 | Fernandez et al. |
| 2005/0005014 A1 | 1/2005 | Holmes et al. |
| 2005/0058094 A1 | 3/2005 | Lazaridis et al. |
| 2005/0182653 A1 | 8/2005 | Urban |
| 2005/0221813 A1* | 10/2005 | Rajahalme et al. ........ 455/422.1 |
| 2005/0282518 A1 | 12/2005 | D'Evelyn |
| 2005/0288045 A1 | 12/2005 | Yang |

* cited by examiner

PEER-TO-PEER MOBILE DATA TRANSFER METHOD AND DEVICE

CROSS REFERENCE TO RELATED APPLICATIONS

This application is a continuation of U.S. patent application Ser. No. 12/832,576 filed Jul. 8, 2010, which is a continuation of U.S. patent application Ser. No. 11/042,620, filed Jan. 24, 2005, which is a continuation-in-part of U.S. patent application Ser. No. 10/817,994, filed Apr. 5, 2004, and a continuation-in-part of U.S. patent application Ser. No. 10/935,342, filed Sep. 7, 2004, which are all incorporated by reference herein.

FIELD OF THE INVENTION

The present invention relates generally to data transfer techniques for mobile devices, and more specifically, a technique to establish data transfer directly between mobile devices.

BACKGROUND OF THE INVENTION

Current multimedia messaging technologies for mobile devices depend upon a server that receives and prepares multimedia content to be retrieved by the recipient of the multimedia message. For example, the Multimedia Messaging Service ("MMS") protocol utilizes a server known as a Multi Media Service Center ("MMSC") to store multimedia content in preparation for a retrieval process initiated by the recipient. Specifically, under MMS, the initiating device initiates a data connection over TCP/IP and performs an HTTP POST of an MMS Encapsulation Format encoded multimedia message to the MMSC. The MMSC stores the multimedia message and makes it available as a dynamically generated URL link. The MMSC then generates a notification message containing the dynamically generated URL and sends the notification message to the recipient through WAP Push over the Short Message Service ("SMS") protocol. When the recipient receives the MMS notification message, it initiates a data connection over TCP/IP and performs an HTTP request to retrieve the MMS message containing multimedia content from the MMSC through the dynamically generated URL.

The MMSC is used, in part, by the MMS protocol in order to provide a known address (e.g., a URL) that can be provided to the recipient in a text based format in order to initiate a data transfer transaction to retrieve the multimedia content. Without such a known address, the sender would be unable to transmit multimedia content to the recipient, since other pre-existing messaging technologies (e.g., SMS) only provide the capability to send limited text, and not multimedia content, directly to the recipient. As such, what is needed is a method to establish data transfer sessions directly between mobile devices, where such mobile devices are capable of directly communicating with other mobile devices through the underlying wireless technology, such that no separate multimedia server and separate retrieval notification message is needed to obtain data (e.g., multimedia content) other than text.

SUMMARY OF THE INVENTION

The present invention provides a method for establishing a direct data transfer session between mobile devices over a digital mobile network system that supports data packet-based communications. Under the present invention, no separate data server need be used to provide a known location from which a recipient retrieves data such as multimedia content. Instead, a mobile device initiating a data transfer opens a listening port defined by an underlying data packet based network protocol. The initiating mobile device sends an invitation message containing the network address, including the listening port, of the initiating device to a target mobile device through a page-mode messaging service (e.g., text based service) supported by the digital mobile network system. The initiating mobile device further utilizes and incorporates a unique identification number (e.g., telephone number, PIN number, etc.) associated with the target mobile device into the invitation message to locate and contact the target mobile device within the wireless mobile network. Once the initiating mobile device receives a response from the target mobile device at the listening port, the two mobile devices are able to establish a reliable virtual connection through the underlying data packet-based network protocol in order to transfer data directly between the two mobile devices.

DETAILED DESCRIPTION OF THE INVENTION

Figure 1:
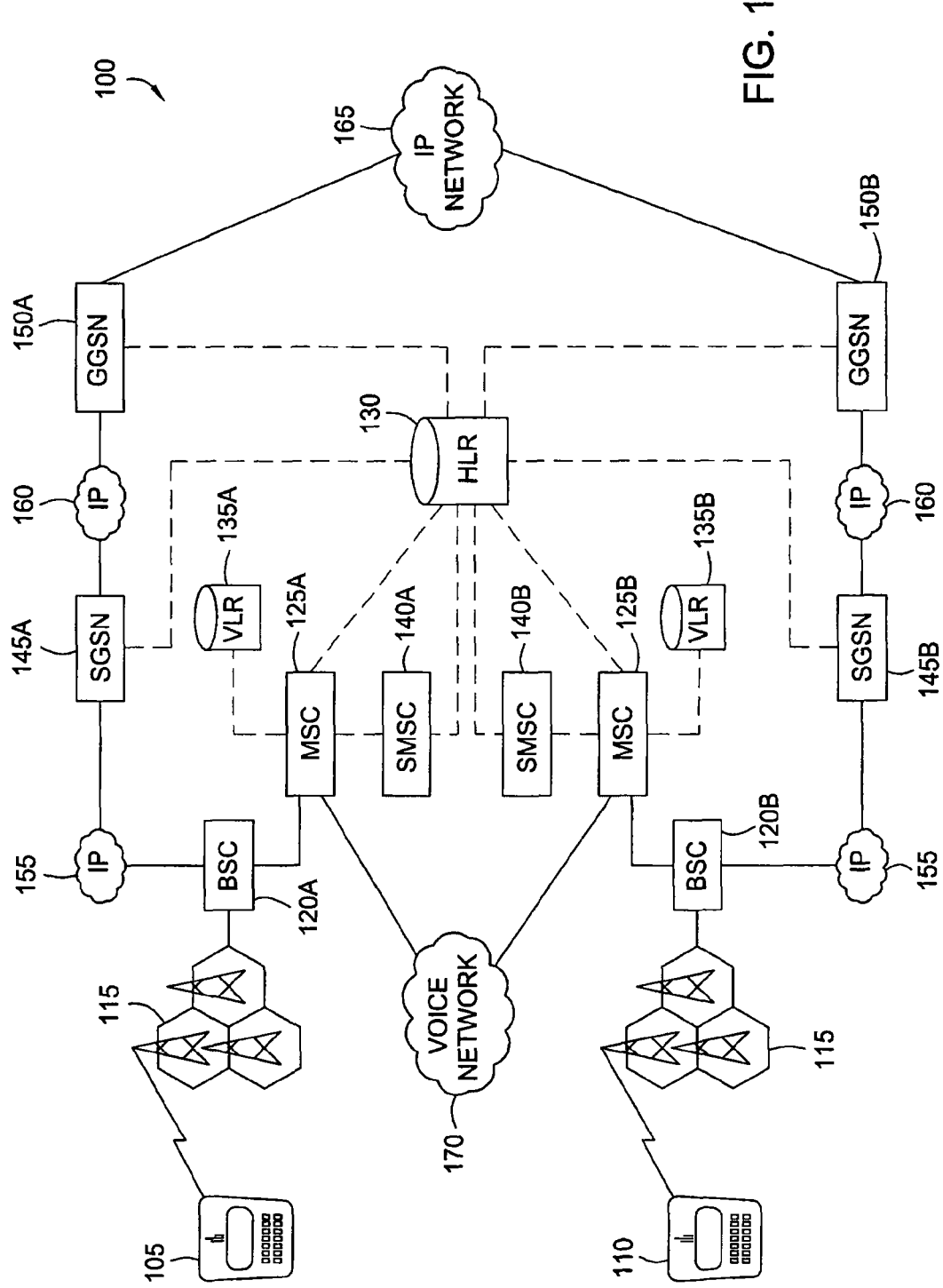
FIG. 1 depicts a diagram of an environment for establishing a data transfer session in accordance with the present invention between a first mobile device and a second mobile device in a GSM mobile network system supporting GPRS as a data packet-based communications service, SMS as a text messaging service, and TCP/IP as an underlying data packet based network protocol.

FIG. 1 depicts one environment to deploy an embodiment of the present invention. As depicted, the underlying digital mobile network system in this environment is the Global System for Mobile communications (GSM) 100 standard. Under the GSM standard, each of the mobile devices 105 and 110 includes a Subscriber Information Module (SIM) card that contains unique identification information that enables the GSM system to locate the mobile devices within the network and route data to them. A current commercial example of a mobile device (e.g., smartphone, PDA, handheld, etc.) that might be used in FIG. 1 could be Research In Motion's (RIM) BlackBerry handheld devices, which include a QWERTY keyboard to facilitate the typing of text. As depicted, a GSM architecture includes the following components: base transceiver stations (BTS) 115 and base station controllers (BSC) (120A or 120B) for managing the transmission of radio signals between the MSC (defined below) and the mobile devices, mobile service-switching centers (MSC) (125A and 125B) for performing the all switching functions and controlling calls to and from other telephone and data systems, a home location register (HLR) 130 for containing all the administrative, routing and location information of each subscriber registered in the network, visitor location registers (VLR) (135A and 135B) for containing selected administrative information about subscribers registered in one HLR who are roaming in a another HLR, and an equipment identity register (EIR) (not shown) for containing a list of all valid mobile equipment on the network). As depicted in FIG. 1, in one architecture of a GSM network, there may be exist one HLR while there may exist multiple MSCs (each with a related VLR) which each serves a different geographic area. The MSCs also provide the interface for the GSM network to more traditional voice networks 170 such as the PSTN. This underlying GSM architecture provides radio resources management (e.g., access, paging and handover procedures, etc.), mobility management (e.g., location updating, authentication and security, etc.), and communication management (e.g., call routing, etc.) in order to enable mobile devices in the GSM network to send and receive data through a variety of services, including the Short Message Service (SMS), an asynchronous bi-directional text messaging service for short alphanumeric messages (up to 160 bytes) that are transported from one mobile device to another mobile device in a store-and-forward fashion.

A GSM network within which the present invention may be deployed would also support a page-mode messaging service, such as SMS, that relies upon the underlying GSM mechanisms to resolve routing information in order to locate destination mobile devices. A GSM network supporting SMS text messaging may further include the following SMS specific components: a short message service center (SMSC) (140A or 140B) for storing and forwarding messages to and from one mobile device to another, an SMS Gateway-MSC (SMS GMSC) for receiving the short message from the SMSC (140A or 140B) and interrogating the destination mobile device's HLR 130 for routing information to determine the current location of the destination device to deliver the short message to the appropriate MSC (125A or 125B). The SMS GMSC is typically integrated with the SMSC 140. In a typical transmission of an SMS text message from an originating mobile device 105 to a receiving mobile device 110, (i) the text message is transmitted from the mobile 105 to the MSC 125A, (ii) the MSC 125A interrogates its VLR 135A to verify that the message transfer does not violate any supplementary services or restrictions, (iii) the MSC 125A sends the text message to the SMSC 140A, (iv) the SMSC 140A, through the SMS GMSC, interrogates the receiving mobile device's HLR 130 (by accessing the SS7 network) to receive routing information for the receiving mobile device 110, (v) the SMSC sends the text message to the MSC 125B servicing receiving mobile device 110, (vi) the MSC 125B retrieves subscriber information from the VLR 135B, and (vii) the MSC 125A transmits the text message to the receiving mobile device 110. Similar to other transactions on the GSM network, SMS text messaging utilizes telephone numbers as identifying addresses for mobile devices and as such, utilizes the SS7 network signaling system through which cellular service providers share information from the HLR with other service providers. As depicted in FIG. 1, SS7 based signaling communication is represented by the broken lines. In contrast, the solid lines in FIG. 1 represent data or voice based communications.

In addition to a page-mode messaging service such as SMS, a GSM network within which the present invention may be deployed would also support a data packet based communications service, such as the General Packet Radio Service (GPRS), that enables TCP/IP transmission protocol based communications between mobile devices within the network. As depicted in FIG. 1, a core GPRS network exists in parallel to the existing GSM core network. The BSC 120 may direct voice traffic through the MSC (125A or 125B) to the GSM network and data traffic through the Serving GPRS Support Note (SGSN) (145A or 145B) to the GPRS network. Such communication between the BSC (125A or 125B) and the SGSN (145A or 145B) may be, for example, based upon the IP network protocol communication 155. As such, GPRS signaling and data traffic do not flow through the core GSM network. Instead, the core GSM network is used by GPRS only for table look-up in the HLR 130 and VLR (135A or 135B) to obtain routing, location and other subscriber information in order to handle user mobility. The SGSN (145A or 145B) serves as a "packet-switched MSC," delivering data packets to mobile devices in its service area. The Gateway GPRS Support Note (GGSN) (150A or 150B) communicates with the SGSN (145A or 145B) through an IP based GPRS backbone 160 and serves as an interface to other external IP networks 165 such as the Internet and other mobile service providers' GPRS services.

In order to provide direct data transfer capabilities between mobile devices, an initiating mobile device must have knowledge of the IP address (and possibly, a port) of the target device in order to establish a direct data transfer. Current mobile multimedia messaging solutions, such as MMS do not provide direct data transfer capabilities because the initiating mobile device is not able to obtain the receiving mobile device's IP address. In essence, servers such as the MMSC that are used in current multimedia messaging solutions serve as a forwarding agent between the two mobile devices that are unable to determine the other devices IP address.

Figure 2:
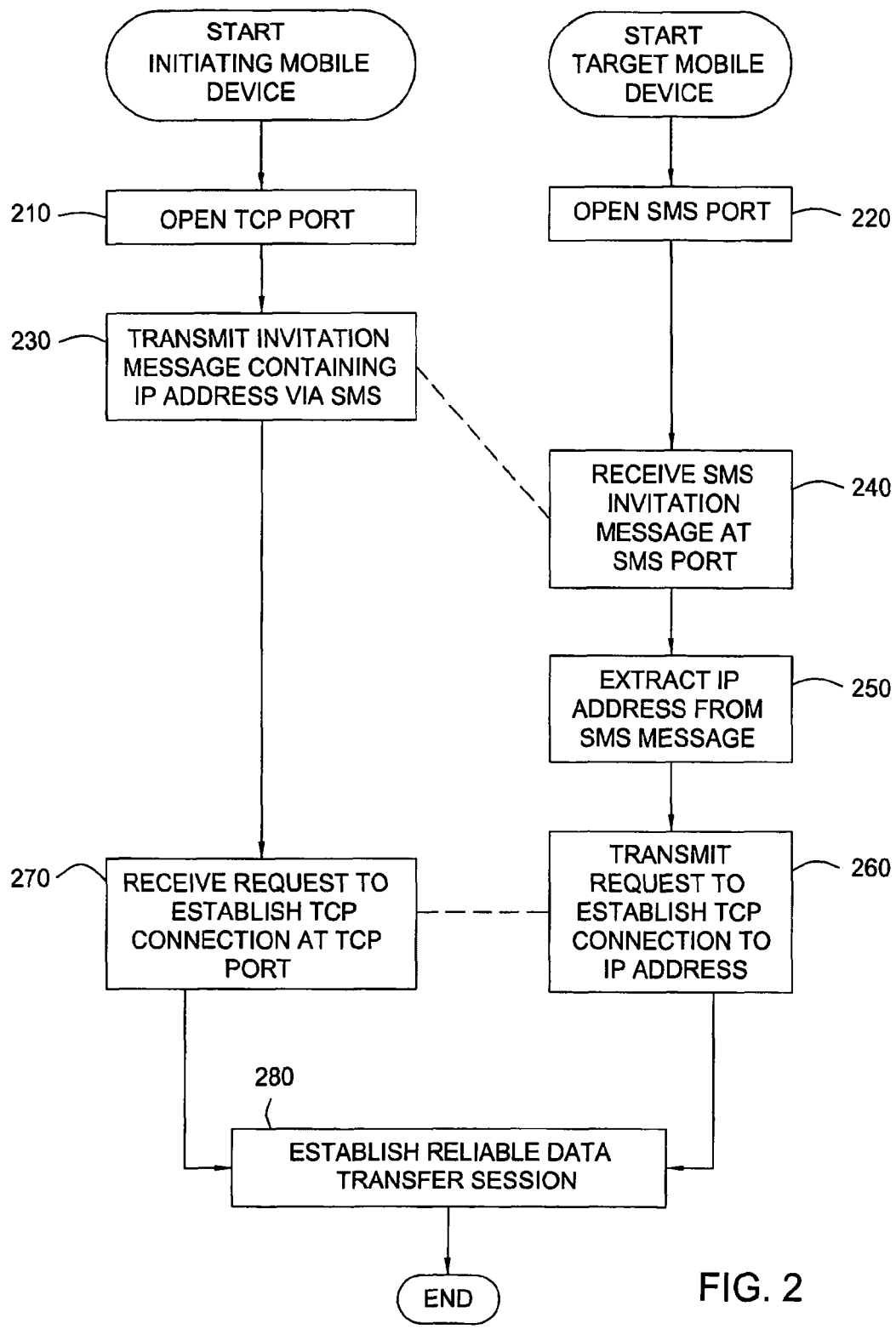
FIG. 2 depicts a flow chart for establishing a data transfer session in accordance with the present invention.

In contrast, in accordance with the present invention, a multimedia server such as the MMSC can be eliminated on a mobile network environment such as that depicted on FIG. 1. Through the use of a page-mode messaging service, such as SMS, which transmits messages to mobile devices based upon their telephone numbers, an initiating mobile device can transmit its IP address (and a listening port) in an invitation message to a target mobile device through the target device's telephone number. Once the target device receives the invitation message, it is able to contact the initiating mobile device through the received IP address and the two devices can establish a reliable virtual connection, such as a TCP connection, for reliable data transfer session. FIG. 2 depicts a flow chart depicting the steps taken by an initiating and target mobile device to establish a direct data transfer session in accordance with the present invention. Initially, the initiating mobile device opens a TCP port to listen for communications from the target mobile device 210. The target mobile device has also similarly opened an SMS listening port to receive invitation SMS text messages at the specified SMS port 220. The initiating mobile device then transmits its IP address (and TCP port) in an invitation SMS text message to the telephone phone number and a specified SMS port of the target mobile device 230. The target mobile device receives the SMS text message containing the initiating mobile device's IP address (and TCP port) at the specified SMS port 240. The target mobile device extracts the IP address and TCP port from the SMS text message and opens its own TCP port 250. The target mobile device then transmits a request to establish a TCP connection to the initiating mobile device's IP address and TCP port 260. The initiating mobile device receives this request 270 and a TCP connection is established between the IP addresses and TCP ports of the initiating and listening mobile devices and these devices are able to engage in a data transfer session over a reliable virtual connection 280.

Figure 3:
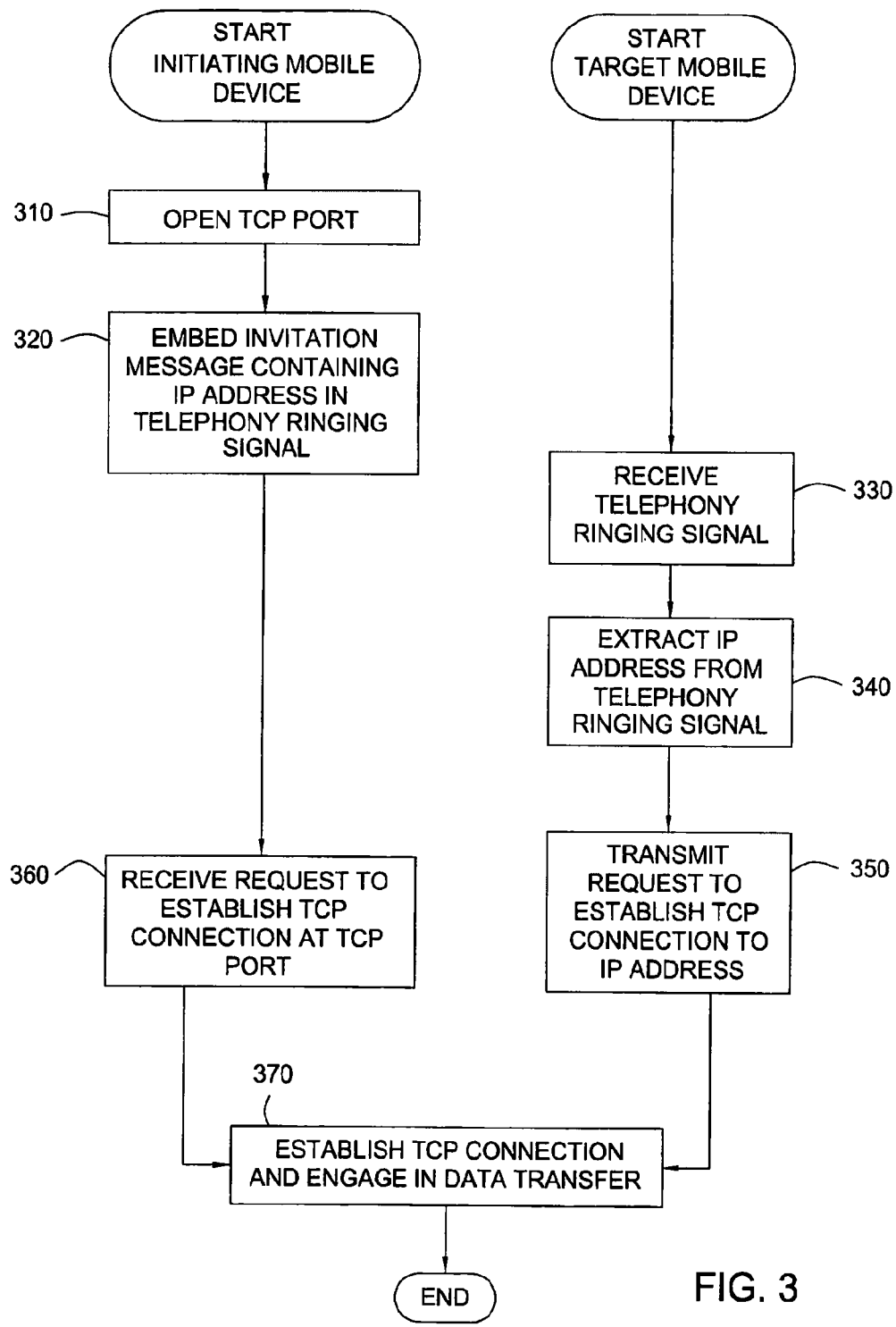
FIG. 3 depicts a flow chart for a second embodiment for establishing a data transfer session in accordance with the present invention.

Alternative, FIG. 3 depicts a flow chart for an alternative embodiment depicting steps to establish a direct data transfer session in accordance with the present invention. Initially, the initiating mobile device opens a TCP port to listen for communications from the target mobile device 310. The initiating mobile device, through its supporting telephone company, then embeds its IP address (and TCP port) in the telephony ringing signal that is transmitted to the target mobile device 320. For example and without limitation, the telephone company may use a frequency shift keyed (FSK) signal to embed the IP address (and TCP port) into the telephony signal, similar to the traditional techniques used to embed other special service information, such as a caller ID, in the traditional telephony context. The target mobile device receives the telephony ringing signal from the initiating mobile device 330. The target mobile device extracts the IP address and TCP port from the telephone ringing signal and opens it's own TCP port 340. The target mobile device than transmits a request to establish a TCP connection to the initiating mobile device's IP address and TCP port 350. The initiating mobile device receives this request 360 and a TCP connection is established between the IP addresses and TCP ports of the initiating and listening mobile devices and these devices are able to engage in a direct data transfer session over a reliable virtual connection 370.

While the foregoing detailed description has described the present invention using SMS, GSM, GPRS, and TCP/IP, other similar services and protocols may be used in a variety of similar environments in which the present invention may be implemented. For example and without limitation, rather than using SMS to transmit an IP address (and port) from the initiating mobile device to the listening mobile device through the devices' telephone numbers, an alternative embodiment of the present invention might use a PIN-to-PIN messaging technology (as, for example, offered in RIM's Blackberry handheld devices) to transmit the IP address (and port) through unique PIN numbers associated with the mobile devices, or an alternative paging protocol using telephone numbers. Similarly, rather than using FSK to embed the IP address (and port) into the telephony ringing signal, an alternative embodiment of the present invention might use a Duel Tone Multi-Frequency (DTMF) transmission to embed the IP address and port. Furthermore, the present invention contemplates that the actual protocol used during an established IM session may also vary depending upon the preference of the implementation. For example and without limitation, Message Session Relay Protocol (MSRP) or any proprietary based protocol may be used during the IM session that is established in accordance with the present invention. Thus, various modifications, additions and substitutions and the like can be made without departing from the spirit of the invention and these are therefore considered to be within the scope of the invention as defined in the following claims.

What is claimed is:

1. A method of establishing a direct data transfer session between mobile devices that support a data packet-based communications service over a digital mobile network system, the method comprising:
   upon receiving an indication by a user of an initiating mobile device to initiate a direct data transfer session with a target mobile device, opening a listening software port on the initiating mobile device to receive communications through the data packet-based communications service from the target mobile device;
   transmitting an invitation message to the target mobile device through a push messaging service, wherein the invitation message comprises a network address associated with the initiating mobile device and port information corresponding to the opened listening software port, and wherein the target mobile device is located by providing a unique identifier to the push messaging service;
   receiving a message from the target mobile device addressed to the listening software port of the initiating wireless device; and
   establishing a data transfer session through the data packet-based communications service between the initiating mobile device and the target mobile device, wherein the data transfer session is established in a peer-to-peer fashion using the network address and port information received without a server intermediating communications through the established data transfer session between the initiating mobile device and the target mobile device.

2. The method of claim 1 further comprising:
   opening a second listening software port on the initiating mobile device to receive invitation messages through the push messaging service;
   receiving, at the second listening software port and through the push messaging service, a message from another mobile device inviting the initiating mobile device to establish a data transfer session, wherein such message comprises a network address associated with the other mobile device; and
   transmitting a response to the network address associated with the other mobile device, wherein the response acknowledges the ability to establish a data transfer session.

3. The method of claim 1, wherein the network address of the initiating mobile device is an IP address.

4. The method of claim 1, wherein the push messaging service is SMS.

5. The method of claim 1, wherein the push messaging service is a PIN-to-PIN messaging service.

6. The method of claim 1, wherein the unique identifier is a telephone number.

7. The method of claim 1, wherein the data transfer session utilizes a TCP connection.

8. A mobile device enabled to establish a direct data transfer session with other mobile devices in a digital mobile network system, the mobile device comprising a processor configured to perform the steps of:
   upon receiving an indication by a user of an initiating mobile device to initiate a direct data transfer session with a target mobile device, opening a listening software port on the initiating mobile device to receive communications through the data packet-based communications service from the target mobile device;
   transmitting an invitation message to the target mobile device through a push messaging service, wherein the invitation message comprises a network address associated with the initiating mobile device and port information corresponding to the opened listening software port, and wherein the target mobile device is located by providing a unique identifier to the push messaging service;
   receiving a message from the target mobile device addressed to the listening software port of the initiating wireless device; and
   establishing a data transfer session through the data packet-based communications service between the initiating mobile device and the target mobile device, wherein the data transfer session is established in a peer-to-peer fashion using the network address and port information received without a server intermediating communications through the established data transfer session between the initiating mobile device and the target mobile device.

9. The mobile device of claim 8, wherein the processor is further configured to perform the steps of:
   opening a second listening software port on the initiating mobile device to receive invitation messages through the push messaging service;
   receiving, at the second listening software port and through the push messaging service, a message from another mobile device inviting the initiating mobile device to establish a data transfer session, wherein such message comprises a network address associated with the other mobile device; and transmitting a response to the network address associated with the other mobile device, wherein the response acknowledges the ability to establish a data transfer session.

10. The mobile device of claim 8, wherein the network address of the initiating mobile device is an IP address.

11. The mobile device of claim 8, wherein the push messaging service is SMS.

12. The mobile device of claim 8, wherein the push messaging service is a PIN-to-PIN messaging service.

13. The mobile device of claim 8, wherein the unique identifier is a telephone number.

14. The mobile device of claim 8, wherein the data transfer session utilizes a TCP connection.

15. A non-transitory computer-readable storage medium including instructions that, when executed on a processor of a mobile device that supports a data packet-based communications service over a digital mobile network system, causes the processor to establish a direct data transfer session by performing the steps of:

upon receiving an indication by a user of an initiating mobile device to initiate a direct data transfer session with a target mobile device, opening a listening software port on the initiating mobile device to receive communications through the data packet-based communications service from the target mobile device;

transmitting an invitation message to the target mobile device through a push messaging service, wherein the invitation message comprises a network address associated with the initiating mobile device and port information corresponding to the opened listening software port, and wherein the target mobile device is located by providing a unique identifier to the push messaging service;

receiving a message from the target mobile device addressed to the listening software port of the initiating wireless device; and establishing a data transfer session through the data packet-based communications service between the initiating mobile device and the target mobile device, wherein the data transfer session is established in a peer-to-peer fashion using the network address and port information received without a server intermediating communications through the established data transfer session between the initiating mobile device and the target mobile device.

16. The non-transitory computer-readable storage medium of claim 15, further including instructions that cause the processor to perform the steps of:

opening a second listening software port on the initiating mobile device to receive invitation messages through the push messaging service;

receiving, at the second listening software port and through the push messaging service, a message from another mobile device inviting the initiating mobile device to establish a data transfer session, wherein such message comprises a network address associated with the other mobile device; and transmitting a response to the network address associated with other mobile device, wherein the response acknowledges the ability to establish a data transfer session.

17. The non-transitory computer-readable storage medium of claim 15, wherein the network address of the initiating mobile device is an IP address.

18. The non-transitory computer-readable storage medium of claim 15, wherein the push messaging service is SMS.

19. The non-transitory computer-readable storage medium of claim 15, wherein the unique identifier is a telephone number.

20. The non-transitory computer-readable storage medium of claim 15, wherein the data transfer session utilizes a TCP connection.

* * * * *